United States Patent
Kurachi et al.

(10) Patent No.: US 7,727,407 B2
(45) Date of Patent: Jun. 1, 2010

(54) AMORPHOUS MATERIAL PROCESSING METHOD

(75) Inventors: Junji Kurachi, Takarazuka (JP);
Kazuishi Mitani, Takarazuka (JP);
Yasuhiro Saito, Takatuki (JP); Hiroyuki Inomata, Takarazuka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 539 days.

(21) Appl. No.: 11/131,816

(22) Filed: May 17, 2005

(65) Prior Publication Data

US 2005/0211673 A1    Sep. 29, 2005

Related U.S. Application Data

(63) Continuation-in-part of application No. 09/949,692, filed on Sep. 10, 2001, now Pat. No. 6,913,702.

(30) Foreign Application Priority Data

Sep. 13, 2000 (JP) ............... 2000-278299
Sep. 4, 2001 (JP) ............... 2001-267198

(51) Int. Cl.
*C03C 25/66* (2006.01)
(52) U.S. Cl. .............. 216/11; 216/22; 216/24; 216/52; 216/53; 216/83; 216/97; 451/41
(58) Field of Classification Search .......... 216/97, 216/98
See application file for complete search history.

(56) References Cited

U.S. PATENT DOCUMENTS

| 3,632,406 | A | * | 1/1972 | Clough et al. ............ 427/255.5 |
| 4,046,619 | A | | 9/1977 | Rice et al. |
| 4,063,991 | A | | 12/1977 | Farrall et al. |
| 4,802,160 | A | * | 1/1989 | Yamada et al. ............ 369/284 |
| 4,833,001 | A | | 5/1989 | Kijima et al. |
| 5,087,481 | A | * | 2/1992 | Chen et al. ............ 427/129 |
| 5,743,998 | A | | 4/1998 | Park |
| 5,764,353 | A | * | 6/1998 | Tate et al. ............ 356/239.8 |
| 5,772,905 | A | | 6/1998 | Chou |
| 5,871,654 | A | | 2/1999 | Mannami et al. |
| 5,916,656 | A | * | 6/1999 | Kitayama et al. ............ 428/64.1 |
| 5,919,591 | A | * | 7/1999 | Senba et al. ............ 430/65 |

(Continued)

FOREIGN PATENT DOCUMENTS

JP   62026623 A  *  2/1987

(Continued)

*Primary Examiner*—Anita K Alanko
(74) *Attorney, Agent, or Firm*—Frishauf, Holtz, Goodman & Chick, P.C.

(57) ABSTRACT

There are provided a method of processing an amorphous material which is capable of forming surface projections of uniform height in desired positions on the amorphous material, and a magnetic disk substrate using the amorphous material. A predetermined pressure is applied to selected parts of a surface of an amorphous material using fine particles having a hardness higher than that of the amorphous material to form high-density compressed layers, and a surface layer of the amorphous material is removed using a treatment agent that has a different removal capacity in the compressed layers and a remaining uncompressed layer, thus making the compressed layers project out. For example, the treatment agent may be an etching solution having a different etching rate in the compressed layers and the uncompressed layer.

9 Claims, 3 Drawing Sheets

U.S. PATENT DOCUMENTS

| | | | |
|---|---|---|---|
| 5,990,617 A * | 11/1999 | Kanae et al. | 313/582 |
| 6,045,715 A * | 4/2000 | Spierings et al. | 216/47 |
| 6,074,279 A * | 6/2000 | Yoshimura et al. | 451/37 |
| 6,241,903 B1 | 6/2001 | Savant | |
| 6,383,404 B1 | 5/2002 | Sakai et al. | |
| 6,548,139 B2 * | 4/2003 | Sakai et al. | 428/848.2 |
| 6,550,278 B2 * | 4/2003 | Mitani et al. | 65/30.14 |
| 6,553,788 B1 * | 4/2003 | Ikeda et al. | 65/31 |
| 6,568,995 B1 * | 5/2003 | Mitani et al. | 451/36 |
| 6,725,525 B1 * | 4/2004 | Shikama et al. | 29/602.1 |
| 6,743,529 B2 * | 6/2004 | Saito et al. | 428/846.9 |
| 6,782,717 B2 * | 8/2004 | Saito et al. | 65/30.14 |
| 6,808,645 B2 * | 10/2004 | Nakabayashi et al. | 216/41 |
| 6,821,893 B2 * | 11/2004 | Kurachi et al. | 438/690 |
| 7,040,953 B2 * | 5/2006 | Matsuno et al. | 451/5 |
| 7,140,203 B2 * | 11/2006 | Saito et al. | 65/30.14 |
| 7,354,526 B2 * | 4/2008 | Hidaka et al. | 216/80 |
| 7,611,639 B2 * | 11/2009 | Saito et al. | 216/22 |
| 2002/0061603 A1 * | 5/2002 | Eto | 438/3 |
| 2006/0062129 A1 * | 3/2006 | Saito et al. | 369/272.1 |

FOREIGN PATENT DOCUMENTS

| | | | |
|---|---|---|---|
| JP | 63114866 A * | 5/1988 | |
| JP | 64-42025 A | 2/1989 | |
| JP | 2-038337 A | 2/1990 | |
| JP | 6-340448 A | 12/1994 | |
| JP | 7-182655 A | 7/1995 | |
| JP | 7-296380 A | 11/1995 | |
| JP | 8-249654 A | 9/1996 | |
| JP | 8-329454 A | 12/1996 | |
| JP | 9-194229 A | 7/1997 | |
| JP | 2000-132829 A | 5/2000 | |
| JP | 2002-160943 A | 6/2002 | |
| JP | 2003069059 A * | 3/2003 | |

* cited by examiner

AMORPHOUS MATERIAL PROCESSING METHOD

CROSS REFERENCE TO RELATED APPLICATION

This application is a continuation-in-part (CIP) of U.S. application Ser. No. 09/949,692, filed Sep. 10, 2001 now U.S. Pat. No. 6,913,702, the entire text of which is incorporated herein by reference.

BACKGROUND OF THE INVENTION

1. Field of the Invention

The present invention relates to a method of processing an amorphous material such as an inorganic glass material.

2. Prior Art

As an amorphous material, glass has a high hardness and homogenous physical properties, and is also cheap, and hence is used in a variety of fields.

For example, if a glass substrate having minute projections formed on a surface thereof is used in a liquid crystal display element, then the projections fulfill a role of determining the length of the so-called cell gap in the liquid crystal display element. Without using glass beads for adjusting the cell gap, therefore, a liquid crystal display element having a desired cell gap can be manufactured.

Moreover, if a glass substrate having such minute projections or minute undulations formed on a surface thereof is used in an optical disk or a magnetic-optical disk, then the minute projections or minute undulations fulfill an important role in signal reading. Moreover, such a glass substrate is an important component in the manufacture of an optical diffraction grating having regularly arranged projections.

Furthermore, such glass substrates are also widely used as magnetic disk substrates in hard disk drives (HDDs).

In an HDD, a driving method called the CSS (contact start stop) method is commonly adopted. In this method, a magnetic head of the HDD contacts the disk surface when the disk is stationary, and then when the HDD is started up, the magnetic head is made to rise up slightly from the disk surface and the disk is rotated at high speed.

When an HDD is driven using the CSS method, it is common to form minute undulations referred to as texture on a surface of the glass substrate, to prevent the magnetic head from sticking to the disk when the magnetic head is made to rise up during startup and reduce friction during startup and stopping. Although glass is a brittle material and hence shape processing is much more difficult to carry out than with a plastic material, because glass is useful as a disk substrate, various methods of forming such minute undulations on a surface of a glass substrate have been developed and put to practical application in the past.

For example, Japanese Laid-open Patent Publication (Kokai) No. 64-42025 discloses art in which minute undulations are formed on a glass substrate by etching using a fluorine-containing liquid or hydrogen fluoride gas (prior art 1).

Moreover, Japanese Laid-open Patent Publication (Kokai) No. 7-296380 discloses art in which a glass substrate is subjected to crystallization treatment and a surface of the glass substrate is mirror polished, and then treatment is carried out using an etching solution prepared by adding sulfuric acid or ammonium fluoride to hydrofluoric acid, thus forming minute undulations on the surface of the glass substrate (prior art 2).

Furthermore, Japanese Laid-open Patent Publication (Kokai) No. 8-249654 discloses art in which ultrafine particles are applied in a mono-dispersed state onto a surface of a substrate, a surface protecting layer is next etched by dry etching, and then the ultrafine particles are removed, thus forming minute undulations on the surface of the substrate (prior art 3).

Moreover, Japanese Laid-open Patent Publications (Kokai) Nos. 7-182655 and 9-194229 disclose art in which a laser beam of a predetermined energy is irradiated onto a surface of a glass substrate to cause the surface to rise up at the places of laser beam irradiation, thus forming projections on the surface of the glass substrate (prior art 4).

However, in the case of the above-mentioned prior art 1, etching is merely carried out on a glass having a predetermined chemical composition using a fluorine-containing liquid or hydrogen fluoride gas. There is thus a problem that a rough surface is formed with the surface undulations having an uneven projection height; it is difficult to obtain a texture having a uniform projection height.

Moreover, in the case of the above-mentioned prior art 2, a glass substrate is subjected to crystallization treatment to form a crystallized layer and an amorphous layer, and surface undulations are formed on the glass substrate by utilizing the difference in etching rate between the crystallized layer and the amorphous layer. There is thus a problem that the method cannot be applied to a normal homogenous glass material.

Furthermore, in the case of the above-mentioned prior art 3, ultrafine particles are coated onto a substrate, dry etching is next carried out, and then the ultrafine particles are removed. As is different to normal etching treatment in which masking is carried out using a metallic mask, it would appear that minute surface undulations can be formed, but there is a problem that dry etching is slow, resulting in high costs and in the method not being suited to mass production.

Moreover, in the case of the above-mentioned prior art 4, a laser is irradiated onto a surface of a glass substrate, and hence there is a problem that the method can only be applied to a glass material that has a large absorption coefficient at a particular wavelength of the laser light. Moreover, the height of the projections formed is very sensitive to the output power of the laser, and hence there is a problem that it is difficult to obtain uniform projections of a desired height.

All of the prior art described above thus suffers from the problem that it is still not possible to form minute undulations having a uniform projection height, or to carry out mass production. Furthermore, in recent years there have been calls in the HDD field for disks of ever higher density. As the density of disks is increased, it becomes necessary to make the projection height of the surface undulations of glass substrates as low as possible and as uniform as possible.

SUMMARY OF THE INVENTION

With the foregoing in view, it is an object of the present invention to provide a method of processing an amorphous material which is capable of forming surface projections of uniform height in desired positions on the amorphous material.

The present inventors carried out assiduous studies with an object of forming minute projections of uniform height in desired positions on an amorphous material, and as a result discovered that by subjecting an amorphous material such as an inorganic glass to high pressure even at normal temperature, plastic flow and hence densification occurs to form a high-density compressed layer, and this compressed layer and the remaining uncompressed layer have different chemical properties.

The present inventors further proceeded with their studies, and discovered that by carrying out treatment to remove a surface layer of the above amorphous material using a treatment agent that has a different removal capacity in the compressed layer and the uncompressed layer, the compressed layer can be made to project out.

The present invention has been attained based on the above findings. The method of processing an amorphous material according to the present invention comprises the steps of applying a predetermined pressure to selected parts of a surface of an amorphous material using fine particles having a hardness higher than that of the amorphous material to form high-density compressed layers, and then removing a surface layer of the amorphous material using a treatment agent that has a different removal capacity in the compressed layers and the remaining uncompressed layer, thus making the compressed layers project out. Moreover, the amorphous material is preferably an inorganic glass, and the treatment agent is preferably an etching solution having a different etching rate in the compressed layers and the uncompressed layer.

In one preferred form of the present invention, the etching solution is an acidic etching solution containing an acid giving a large etching action on the inorganic glass, preferably hydrofluoric acid.

When etching is carried out using the acidic etching solution, some of the components that make up the inorganic glass leach out into the acidic etching solution, resulting in an altered layer being formed on the surface of the uncompressed layer. Results of studies by the present inventors show that the altered layer can be removed by etching with an alkaline etching solution.

In this preferred form of the present invention, therefore, after carrying out first etching using an acidic etching solution as described above, second etching is preferably carried out using an alkaline etching solution.

By carrying out second etching using an alkaline etching solution after the first etching, the altered layer can be removed, resulting in the glass surface being homogenous with the glass interior, and moreover the height of the surface projections is increased, allowing an amorphous material suited to uses requiring a high projection height to be obtained.

The amorphous material is preferably an inorganic glass having a silicon oxide as a principal component thereof. If the inorganic glass also contains an aluminum oxide, however, then this aluminum oxide is easily leached out into acidic solutions, resulting in the etching using the acidic etching solution being promoted. Moreover, an aluminum oxide has excellent corrosion resistance against chemicals other than acids. Consequently, in the high-density compressed layers, the silicon oxide is densified and thus prevents the leaching out of other components of the inorganic glass, whereas in the uncompressed layer, the aluminum oxide is selectively etched by the acidic etching solution. As a result, minute projections can easily be formed on the surface of the inorganic glass.

It is thus preferable for the amorphous material to contain at least a silicon oxide and an aluminum oxide.

Moving on, alkaline earth metal oxides are readily leached out into an alkaline solution containing a chelating agent, but have excellent water resistance. If the amorphous material contains one or more alkaline earth metal oxides, then the alkaline earth metal oxides can thus be selectively etched using an alkaline etching solution containing a chelating agent, resulting in it being possible to form minute projections on the glass surface merely by etching with the alkaline etching solution.

In another preferred form of the present invention, the etching solution is thus an alkaline etching solution containing a chelating agent, and the amorphous material contains at least one oxide selected from the group consisting of a silicon oxide and alkaline earth metal oxides.

The method of forming the compressed layers using fine particles preferably comprises colliding the fine particles into the selected parts of the surface of the amorphous material.

In this method, to prevent the surface of the amorphous material from undergoing scratching or cracking, the fine particles are preferably in the form of a slurry or have a substantially spherical particle shape.

Another preferable method of forming the compressed layers using fine particles comprises attaching the fine particles to a surface of a member, and moving the member relative to the surface of the amorphous material while pressing the surface of the member against the surface of the amorphous material.

In this method, to prevent the surface of the amorphous material from undergoing scratching or cracking, the pressure at which the surface of the member is pressed against the surface of the amorphous material and the speed at which the member is moved relative to the surface of the amorphous material are preferably set to not less than respective predetermined values.

The member preferably comprises a plurality of members, or a member having the surface thereof divided into a plurality of surface portions, whereby a plurality of compressed layers are formed as the compressed layers.

To attain the above object, the present invention provides a method of processing an amorphous material, comprising the steps of applying a predetermined pressure to selected parts of a surface of an amorphous material using fine particles having a hardness higher than that of the amorphous material to form high-density compressed layers, and removing a surface layer of the amorphous material using a treatment agent that has a different removal capacity in the compressed layers and a remaining uncompressed layer, thus making the compressed layers project out.

According to the method of processing an amorphous material of the present invention, a predetermined pressure is applied to selected parts of a surface of an amorphous material using fine particles having a hardness higher than that of the amorphous material to form high-density compressed layers, and then a surface layer of the amorphous material is removed using a treatment agent that has a different removal capacity in the compressed layers and the remaining uncompressed layer, thus making the compressed layers project out. As a result, minute projections of uniform height can be formed in any chosen pattern.

Preferably, the treatment agent is preferably an etching solution having a different etching rate in the compressed layers and the uncompressed layer. As a result, minute projections of uniform height can be formed in any chosen pattern reliably.

More preferably, by using an acidic solution containing an acid as the etching solution, the etching of the uncompressed layer can be carried out efficiently.

In particular, by using an acidic solution containing hydrofluoric acid as the etching solution, the etching of the uncompressed layer can be carried out yet more efficiently.

In a preferred embodiment, first etching is carried out using the acidic solution, and then second etching is carried out using an alkaline solution. As a result, an altered layer formed on the surface of the uncompressed layer by the first etching is removed by the alkaline solution, and hence the glass surface can be made homogenous with the glass interior.

If the alkaline solution contains a chelating agent, etching of the amorphous material can be carried out efficiently.

Even if etching is carried out using only an alkaline solution containing a chelating agent, minute undulations can be formed on the surface of the amorphous material through the etching action.

If an inorganic glass is used as the amorphous material, then by subjecting parts of the inorganic glass to high pressure even at normal temperature, plastic flow and densification occurs to form high-density compressed layers, with these compressed layers and the remaining uncompressed layer having different chemical properties. As a result, minute projections of uniform height can be formed in any chosen pattern reliably.

Moreover, if the inorganic glass contains at least a silicon oxide and an aluminum oxide, then in the high-density compressed layers, the densified silicon oxide prevents the leaching out of other components of the inorganic glass, whereas in the uncompressed layer, the aluminum oxide, which has low acid resistance, is selectively etched. As a result, desired minute projections can be formed rapidly and easily.

Moreover, if the inorganic glass contains at least one oxide selected from the group consisting of a silicon oxide, and alkaline earth metal oxides, then in the high-density compressed layers, the densified silicon oxide prevents the leaching out of other components of the inorganic glass, whereas in the uncompressed layer, the alkaline earth metal oxides can be selectively etched by an alkaline etching solution containing a chelating agent. As a result, desired minute projections can be formed rapidly and easily, merely by etching using an alkaline etching solution.

If the step of forming the compressed layers using fine particles comprises colliding the fine particles into the selected parts of the surface of the amorphous material, minute projections of uniform height can be reliably formed in any chosen pattern.

If the fine particles are in the form of a slurry or have a substantially spherical particle shape, the surface of the amorphous material can be prevented from undergoing scratching or cracking.

Alternatively, even if the step of forming the compressed layers using fine particles comprises attaching the fine particles to a surface of a member, and moving the member relative to the surface of the amorphous material while pressing the surface of the member against the surface of the amorphous material, minute projections of uniform height can be reliably formed in any chosen pattern.

More preferably, the pressure at which the surface of the member is pressed against the surface of the amorphous material and the speed at which the member is moved relative to the surface of the amorphous material are preferably set to not less than respective predetermined values, whereby the surface of the amorphous material can be prevented from undergoing scratching or cracking.

Also preferably, the member preferably comprises a plurality of members, or a member having the surface thereof divided into a plurality of surface portions, whereby a plurality of compressed layers can be formed as the compressed layers.

The above and other objects, features and advantages of the invention will become more apparent from the following detailed description taken in conjunction with the accompanying drawings.

BRIEF DESCRIPTION OF THE DRAWINGS

FIG. 1A shows a state before commencing manufacture;

FIG. 1B shows a state after an indenter having a pyramid shape has been pressed into a surface of an inorganic glass;

FIG. 1C shows a state after carrying out first etching; and

FIG. 1D shows a state after removing an altered layer 7;

FIG. 2A shows a step of pressing a spherical indenter 8 against a surface of the inorganic glass 1 and then sweeping the indenter 8 on the surface of the inorganic glass 1;

FIG. 2B shows a state after carrying out first etching; and

FIG. 2C shows a state after removing an altered layer 11;

DETAILED DESCRIPTION OF THE PREFERRED EMBODIMENTS

Embodiments of the present invention will now be described with reference to the drawings.

FIGS. 1A to 1D are views useful in explaining manufacturing steps in a method of processing an amorphous material according to a first embodiment of the present invention.

Figure 1A:
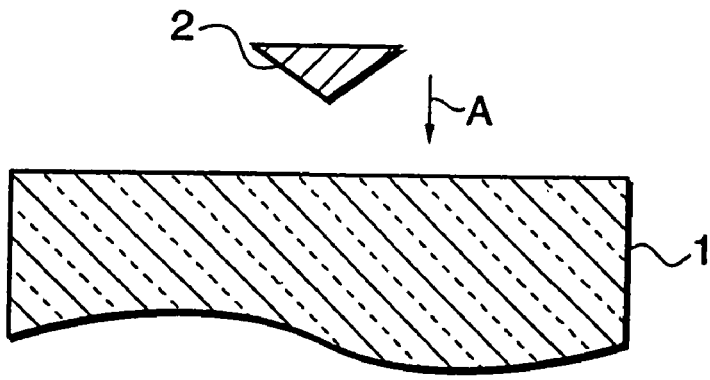
FIGS. 1A to 1D are views useful in explaining manufacturing steps in a method of processing an amorphous material according to a first embodiment of the present invention, specifically.

In FIG. 1A, reference numeral 1 designates an amorphous material, namely an inorganic glass. In the present embodiment, in consideration of the ability to be etched by acidic and alkaline solutions and the properties when used as a magnetic disk substrate, the compositional range of the inorganic glass 1 is made to be 55 mol % to 72 mol % of $SiO_2$, 1 mol % to 12.5 mol % of $Al_2O_3$, a total of 2 mol % to 16 mol % of alkaline earth metal oxides (MgO, CaO, SrO and BaO), 5 mol % to 20 mol % of $Li_2O$, and not more than 12 mol % of $Na_2O$.

The reasons for these restrictions on the composition of the inorganic glass 1 are as follows.

$SiO_2$ is the principal component of the inorganic glass. If the $SiO_2$ content is less than 55 mol %, then the durability of the glass will be poor, whereas if the $SiO_2$ content is greater than 72 mol %, then the viscosity will become too high and hence melting will become difficult. In the present embodiment, the $SiO_2$ content is thus set to be in a range of 55 mol % to 72 mol %.

$Al_2O_3$ is a component that increases the durability of the glass, and is also readily leached out by an acidic etching solution. If the $Al_2O_3$ content is less than 1 mol %, then the intended effects will not be realized, whereas if the $Al_2O_3$ content is greater than 12.5 mol %, then the viscosity will become too high and the devitrification resistance will drop, and hence melting will become difficult. In the present embodiment, the $Al_2O_3$ content is thus set to be in a range of 1 mol % to 12.5 mol %.

Alkaline earth metal oxides such as MgO, CaO, SrO and BaO increase the meltability of the inorganic glass, and are also readily leached out by an alkaline etching solution containing a chelating agent, resulting in the promotion of etching using such an alkaline etching solution. If the total alkaline earth metal oxide content is less than 2 mol %, then the intended effects will not be realized, whereas if the total alkaline earth metal oxide content is greater than 16 mol %, then the liquid phase temperature of the glass will rise, and the devitrification resistance will become poor. In the present embodiment, the total alkaline earth metal oxide (MgO, CaO, SrO and BaO) content is thus set to be in a range of 2 mol % to 16 mol %.

$Li_2O$ is a component that increases the meltability of the glass. If the $Li_2O$ content is less than 5 mol %, then the viscosity will rise and hence melting will be difficult, whereas if the $Li_2O$ content is greater than 20 mol %, then the chemical durability will be poor. In the present embodiment, the $Li_2O$ content is thus set to be in a range of 5 mol % to 20 mol %.

$Na_2O$ is also a component that increases the meltability of the glass. If the $Na_2O$ content is greater than 12 mol %, then the chemical durability will be poor. In the present embodiment, the $Na_2O$ content is thus set to be not more than 12 mol %.

Note also that by including alkali metal oxides such as $Li_2O$ and $Na_2O$ in the inorganic glass 1, chemical strengthening by ion exchange becomes possible.

Moreover, so long as there is no impairment of the properties required in the present invention, colorants such as $Fe_2O_3$, MnO, NiO, $Cr_2O_3$ and CoO may be included in the inorganic glass 1.

An inorganic glass 1 having a composition as described above is suitable as a magnetic disk substrate. However, the present invention can also be effectively applied to an inorganic glass containing $B_2O_3$ in addition to $Al_2O_3$, an alkali-free glass, an inorganic glass intended for optical use having a component for controlling the refractive index, or the like.

Figure 1B:
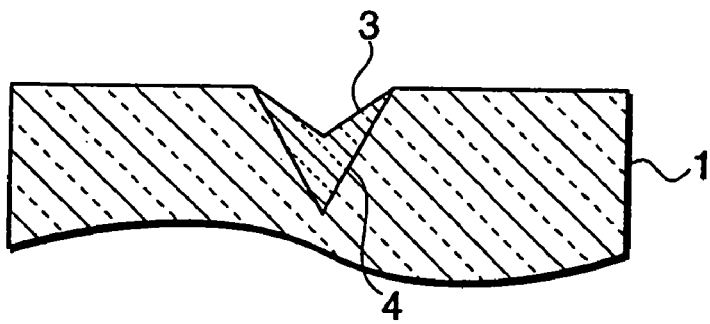

With the inorganic glass 1 having the above-mentioned composition, an indenter 2 having a pyramid shape is pressed into a surface of the inorganic glass 1 as shown by the arrow A in FIG. 1A, thus forming a compressed layer 4 having a depression 3 therein on the surface of the inorganic glass 1 as shown in FIG. 1B. This process can be repeated to form such a compressed layer 4 in each of a plurality of desired positions.

The indenter 2 must have a hardness higher than that of the inorganic glass 1. For example, a diamond or hard metal material can be used. Moreover, the indenter 2 preferably has a pyramid shape. The shape of the base of the pyramid may be chosen freely in accordance with the desired shape of the projection formed, for example a square-based pyramid may be used. However, from the point of view of preventing cracking, a shape such that there are no ridgelines and the compressive force is distributed evenly, for example a shape having a spherical surface, is preferable.

Moreover, a probe of, for example, a scanning probe microscope (SPM) may be used as the indenter 2. By using an SPM, any desired pattern of compressed layers 4 can be formed with good controllability in a minute region of dimensions of μm order. As well as point-shaped compressed layers 4, by sweeping the probe on the surface of the inorganic glass 1, line-shaped or area-shaped compressed layers 4 can also be formed. Moreover, there are no particular limitations on the material or shape of the probe used.

Moreover, in the present embodiment, the pressure at which the indenter 2 is pressed into the inorganic glass 1 is set, in the case for example of a diamond indenter 2, to approximately 0.3 GPa to 4 GPa. If this load is less than 0.3 GPa, then it will not be possible to form the compressed layer 4 on the surface of the inorganic glass 1, whereas if the load is greater than 4 GPa, then there will be a risk of damage such as cracking occurring. In the present embodiment, the load applied onto the inorganic glass 1 by the indenter 2 is thus set to approximately 0.3 GPa to 4 GPa.

Figure 1C:
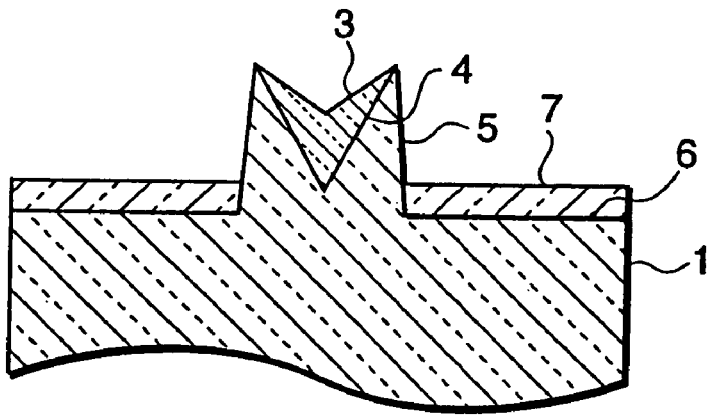

The inorganic glass 1 on which the compressed layers 4 have been formed is next subjected to first etching by immersing in an acidic etching solution, thus removing the surface layer of the inorganic glass 1. As a result, as shown in FIG. 1C, a minute projection 5 is formed in the location of each compressed layer 4, and components other than $SiO_2$ are leached out from an uncompressed layer 6 (i.e. the part of the surface of the inorganic glass 1 other than the compressed layers 4), thus forming an altered layer 7.

The reason for this is as follows. The inorganic glass 1 contains both a component that has high acid resistance and components that have low acid resistance. Specifically, the $SiO_2$ has high acid resistance, whereas the $Al_2O_3$, the alkali metal oxides ($Li_2O$ and $Na_2O$) and the alkaline earth metal oxides (MgO, CaO, SrO and BaO) are readily eroded by acid.

In the high-density compressed layers 4, the densified $SiO_2$ prevents the leaching out of the other components and hence etching by the acidic etching solution does not readily occur. In the uncompressed layer 6, on the other hand, the components other than the $SiO_2$ are selectively etched by the acidic etching solution. Etching thus proceeds in the uncompressed layer 6, and each compressed layer 4 remains behind as a minute projection 5.

Furthermore, in the uncompressed layer 6, components other than the $SiO_2$ are selectively etched by the acidic etching solution as described above, and as a result components other than $SiO_2$ are leached out, resulting in the formation of a porous altered layer 7 on the surface of the uncompressed layer 6.

An aqueous solution of sulfuric acid, nitric acid, hydrochloric acid, fluoroacetic acid or the like can be used as the acidic etching solution. However, to carry out the desired etching rapidly, it is preferable to use a strongly acidic aqueous solution. In particular, most preferable is an aqueous solution containing not less than 0.005 wt % of hydrofluoric acid, which gives an excellent etching action.

Figure 1D:
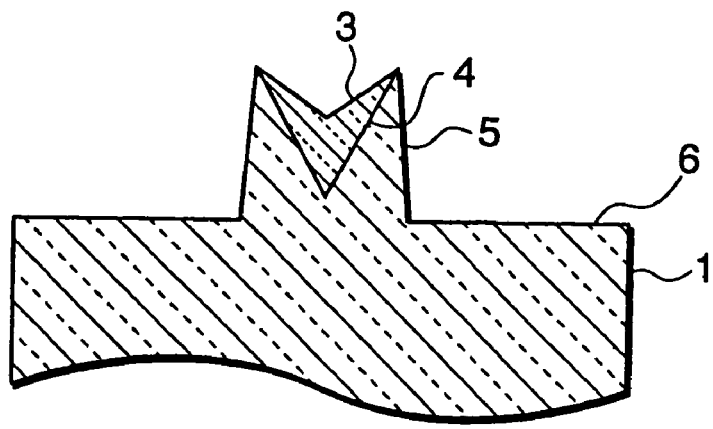

The inorganic glass 1 is next subjected to second etching by immersing in an alkaline etching solution, thus removing the altered layer 7 as shown in FIG. 1D. The altered layer 7 is a chemically unstable porous part formed by the other components than the $SiO_2$ being leached out from the surface of the inorganic glass 1. By removing the altered layer 7, the glass surface becomes homogenous with the glass interior, and a chemically stable structure is obtained.

An aqueous solution of potassium hydroxide having a pH of 11 or more, or a diluted solution of a commercially available alkaline cleaning solution, can, for example, be used as the alkaline etching solution.

Moreover, alkaline earth metal oxides are readily leached out into an alkaline solution containing a chelating agent, and hence it is preferable to carry out the second etching using an alkaline etching solution containing a chelating agent.

An aminocarboxylic acid such as EDTA (ethylenediamine tetraacetic acid) or NTA (nitrilotriacetic acid), a polycarboxylic acid such as oxalic acid, or a phosphate such as STPP (sodium tripolyphosphate) can be used as the chelating agent.

As described above, according to the first embodiment of the present invention, compressed layers 4 are formed, and then a minute projection 5 is formed in each place where a compressed layer 4 has been formed by utilizing the difference in etchability between the compressed layers 4 and the uncompressed layer 6. As a result, minute projections 5 of uniform height can be formed in any chosen pattern on the surface of the inorganic glass 1.

Figure 2A:
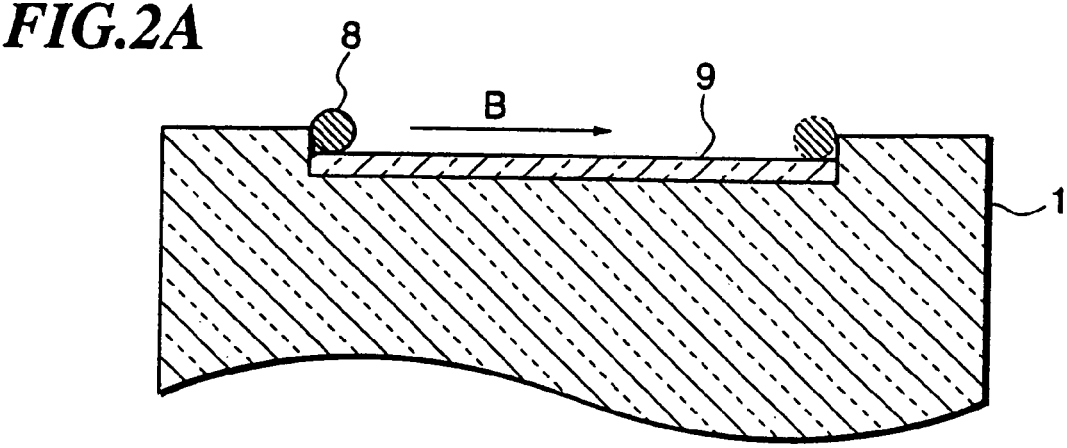
FIGS. 2A to 2C are views useful in explaining manufacturing steps in a method of processing an amorphous material according to a second embodiment of the present invention, specifically.
Figure 2B:
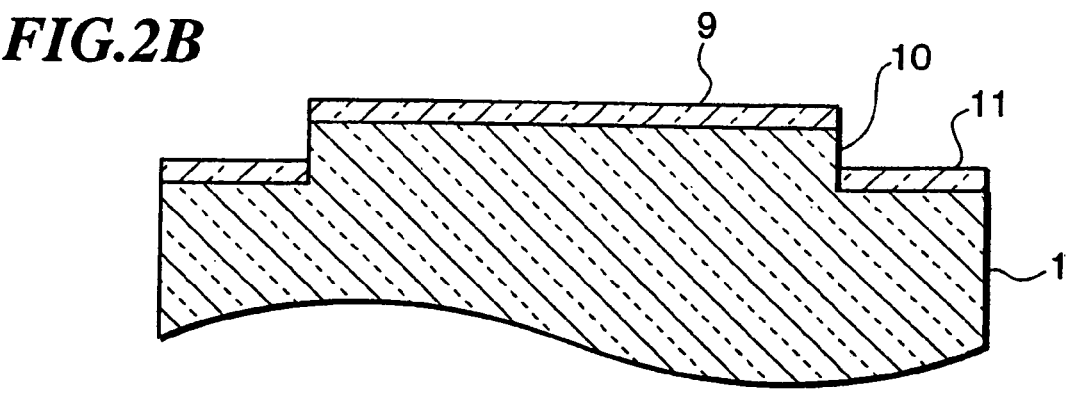
Figure 2C:
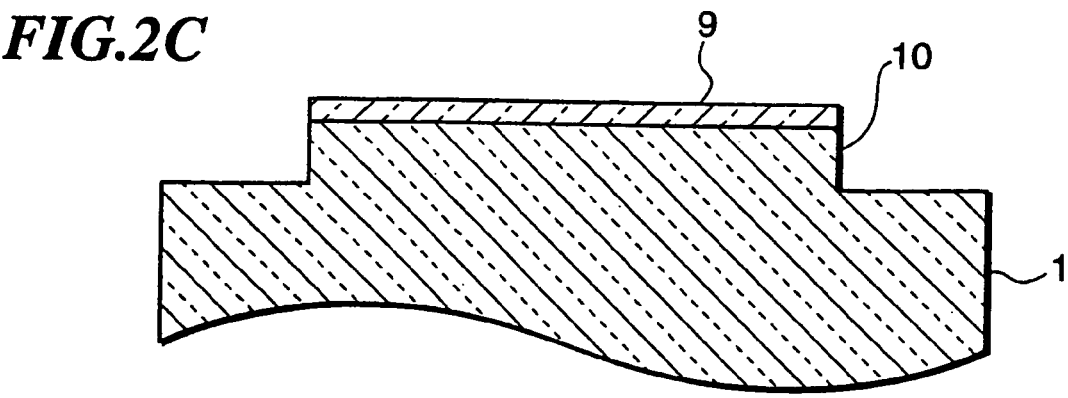

FIGS. 2A to 2C are views useful in explaining manufacturing steps in a method of processing an amorphous material according to a second embodiment of the present invention. In the second embodiment, as shown in FIG. 2A, a spherical indenter 8 is pressed against a surface of an inorganic glass 1 and then swept on the surface of the inorganic glass 1 in the direction of the arrow B, thus forming a linear compressed layer 9 along the trajectory of the indenter 8. This process can be repeated to form such a linear compressed layer 9 in each of a plurality of desired positions.

As in the first embodiment, the inorganic glass 1 is then subjected to first etching by immersing in an acidic etching solution, preferably an aqueous solution of hydrofluoric acid, thus removing a surface layer. As a result, linear minute projections 10 and an altered layer 11 are formed as shown in FIG. 2B.

The altered layer 11 is next removed using an alkaline etching solution, thus completing the manufacture of an inorganic glass 1 having linear minute projections 10 formed thereupon as shown in FIG. 2C.

Even if the compressed layers 9 are formed by sweeping an indenter 8 on the surface of the inorganic glass 1 as described above, as in the first embodiment minute projections 10 of uniform height can be formed in any chosen pattern on the surface of the inorganic glass 1.

Moreover, when the compressed layers 4 are formed as in the first embodiment, a depression 3 is formed in each compressed layer 4 as shown in FIG. 1B. If etching is carried out with the depressions 3 still present, then the minute projections 5 may end up approximately V-shaped or caldera-shaped as shown in FIG. 1D. Depending on the use of the inorganic glass 1, it is thus possible to remove the depressions 3 through surface treatment before carrying out the etching.

The surface treatment must be such that the inorganic glass 1 is not scratched or otherwise damaged, and hence it is preferable to polish using loose abrasive grains having a hardness equal to or lower than that of the inorganic glass 1. Moreover, the loose abrasive grains are preferably spherical. For example, colloidal silica may be used.

Moreover, alkaline earth metals are readily leached out by an alkaline solution containing a chelating agent as described above, and hence compounds containing alkaline earth metals such as MgO, CaO, SrO and BaO are selectively etched by such an alkaline etching solution. When the projection height need not be large, it is thus possible to carry out only etching using an alkaline etching solution (i.e. to omit the etching using an acidic etching solution).

Moreover, when an amorphous material as described above, specifically an inorganic glass, is used as a magnetic disk substrate, it is preferable to carry out chemical strengthening treatment after the second etching using the alkaline etching solution, to increase the surface compressive stress of the glass substrate produced. That is, the inorganic glass is, for example, immersed for 0.5 to 4 hours in a mixed molten salt of potassium nitrate and sodium nitrate in a predetermined volume ratio at a temperature of 360° C. to 380° C., thus exchanging the alkali ions in the inorganic glass with alkali ions having a larger ionic radius, and hence increasing the surface compressive stress. As a result, the magnetic disk substrate can be prevented from being damaged even when rotated at high speed.

Furthermore, using a processing method as described above, a multiplicity of minute projections of uniform height can be distributed in any chosen pattern, for example concentric circles, on a surface of an amorphous material. When the amorphous material thus obtained is used as a magnetic disk substrate, then even if the magnetic disk is driven using the CSS method, sticking of the magnetic head to the substrate during startup can thus be prevented, reading errors caused by the gap between the magnetic head and the substrate fluctuating or the magnetic head and the substrate colliding with one another during running can be prevented, and a magnetic disk substrate having excellent noise characteristics can be obtained.

Figure 3:
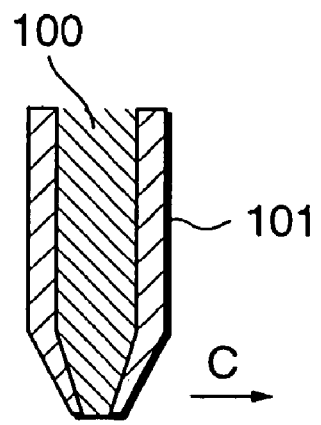
FIG. 3 is a view useful in explaining manufacturing steps in a method of processing an amorphous material according to a third embodiment of the present invention, showing a state before commencing manufacture.
Figure 3:
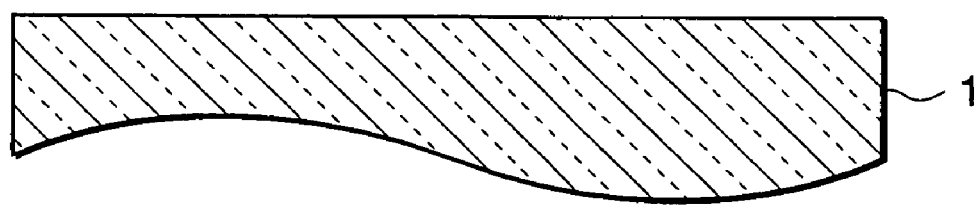

FIG. 3 is a view useful in explaining manufacturing steps in a method of processing an amorphous material according to a third embodiment of the present invention, showing a state before commencing manufacture. In the third embodiment, compressed layers are formed on the surface of an inorganic glass by a blast method, describe later.

In the method of forming the compressed layers according to the third embodiment, fine particles having a hardness higher than that of the inorganic glass 1 are injected onto the surface of the inorganic glass 1 from an injector 101 together with water under high pressure, compressed air, or the like, to form uncompressed layers on selected parts of the surface of the inorganic glass 1.

As the blast method, the so-called sand blast method in which an abrasive is blown together with compressed air to purify and roughen the surface of a glass member is generally used. However, if the sand blast method is used to cause an abrasive to be collided onto the surface of the inorganic glass 1, the surface of the inorganic glass 1 will be randomly scraped, resulting in occurrence of microscopic cracks in the surface.

Therefore, in the method of forming the compressed layers according to the present embodiment, a blast method other than the sand blast method is adopted, to thereby prevent scraping of the surface of the inorganic glass 1 as well as occurrence of cracks therein.

In particular, a wet blast method in which the fine particles 100 are sprayed by an injector 102 onto the inorganic glass 1 in the form of a slurry using a liquid such as water as a medium, because a liquid is used as the medium, the fine particles can be collided into the surface of the inorganic glass 1 without the fine particles agglomerating, and moreover the spraying speed can be easily controlled, allowing compressed layers to be formed uniformly over the surface of the inorganic glass 1, with virtually no scratching or cracking occurring due to excessive pressure. This wet blast method is thus a particularly preferable method of forming the compressed layers.

In the second embodiment, fine particles 100 in the form of a slurry are sprayed into the surface of the inorganic glass 1 by the injector 101 while the injector 101 is moved relative to the surface of the inorganic glass 1 in the direction of the arrow C, thus forming a linear compressed layer on a selected part of the surface of the inorganic glass 1. This process can be repeated to form such a linear compressed layer in each of a plurality of desired positions.

Then, as in the first embodiment, the inorganic glass 1 is then subjected to first etching by immersing in an acidic etching solution, preferably an aqueous solution of hydrofluoric acid, thus removing a surface layer. As a result, linear minute projections and an altered layer are formed. Then, the inorganic glass 1 is next subjected to second etching by immersing in an alkaline etching solution, thus removing the altered layer, whereby a chemically stable structure is obtained.

Alternatively to the wet blast method, an air blast method in which the fine particles 100 are injected into the surface of the inorganic glass 1 together with compressed air by the injector 101 may be adopted. In the air blast method, fine particles 100 having a generally spheric particle shape, i.e. a pointless particle shape may be used, and the injection or collision speed may be controlled. Further, the fine particles 100 should preferably have a mean particle size not less than a predetermined particle size.

Figure 4:
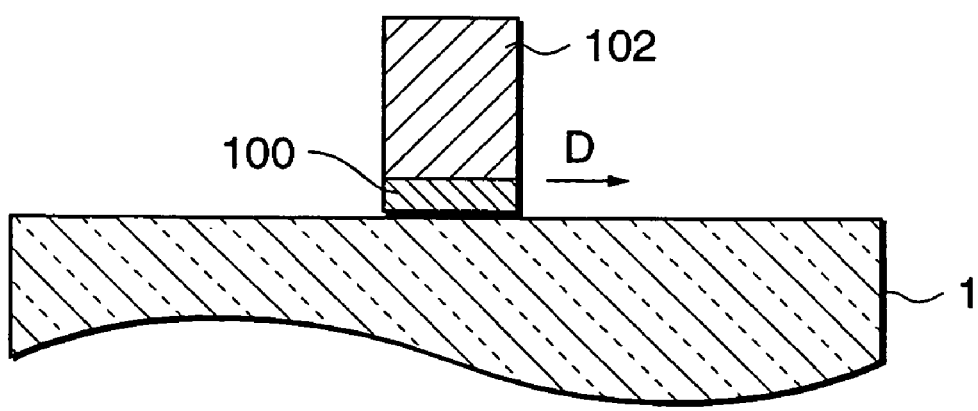
FIG. 4 is a view useful in explaining manufacturing steps in a method of processing an amorphous material according to a fourth embodiment of the present invention, showing a state before commencing manufacture.

FIG. 4 is a view useful in explaining manufacturing steps in a method of processing an amorphous material according to a fourth embodiment of the present invention, showing a state before commencing manufacture.

In the method of forming the compressed layers according to the fourth embodiment, a member 102 to an end face of which fine particles having a hardness higher than that of the inorganic glass 1 are attached and fixed is moved relative to the surface of the inorganic glass 1, i.e. in the direction of the arrow D while being pressed against the surface of the inorganic glass 1, to form uncompressed layers on selected parts of the surface of the inorganic glass 1.

The pressure at which the surface of the member 102 is pressed against the surface of the inorganic glass 1 and the speed at which the member 102 is moved relative to the surface of the inorganic glass 1 should be set to not less than respective predetermined values so as to prevent the surface of the inorganic glass 1 from undergoing scratching or cracking.

The member 102 should be preferably formed of a metallic material, but the material is not limited to a metallic material, and insofar as the member 102 has such a shape as to achieve the object of the present invention, any material may be adopted. The fixing of the fine particles 100 to the member 102 may be carried out using an adhesive. Further, the fine particles 100 may preferably have a generally spherical particle shape which prevents scraping and cracking of the surface of the inorganic glass 1.

The member 102 with the fine particles 100 attached thereto may be formed of a plurality of members, or a member having the surface or end face with the fine particles 100 attached thereto, divided into a plurality of surface portions, whereby a plurality of compressed layers are formed as the compressed layers on the surface of the inorganic glass 1.

Moreover, the member 102 may be in the form of a tape. In this case, the member 102 in the form of a tape may be moved relative to the surface of the inorganic glass 1 while being pressed against the same, or the tape may be moved on the surface of the inorganic glass 1 in sliding urging contact with the same. In this case, the fine particles 100 are bonded to the surface of the tape by adhesive. Further alternatively, a slurry of the fine particles 100 may be fed to the surface of the tape while the tape is moved relative to the surface of the inorganic glass 1.

In the third embodiment, the member 102 is moved relative to the surface of the inorganic glass 1 in the direction of the arrow D while the fine particles 1 are pressed against the surface of the inorganic glass 1, thus forming a linear compressed layer on a selected part of the surface of the inorganic glass 1. This process can be repeated to form such a linear compressed layer in each of a plurality of desired positions.

Then, as in the first embodiment, the inorganic glass 1 is then subjected to first etching by immersing in an acidic etching solution, preferably an aqueous solution of hydrofluoric acid, thus removing a surface layer. As a result, linear minute projections and an altered layer are formed. Then, the inorganic glass 1 is next subjected to second etching by immersing in an alkaline etching solution, thus removing the altered layer, whereby a chemically stable structure is obtained.

A description will now be given of specific examples of the present invention.

Table 1 shows compositions of the inorganic glass 1 used in the present examples. The present inventors manufactured test pieces described below (Examples 1 to 17 and Comparative Example 1 and 2) using an inorganic glass 1 of one of the compositions 1 to 8 shown in Table 1 in each case, and examined the state of the surface projections (diameter or edge length of base and projection height) in each case.

TABLE 1

| COMPOSITION | $SiO_2$ | $B_2O_3$ | $Al_2O_3$ | MgO | CaO | BaO | $Li_2O$ | $Na_2O$ | $Fe_2O_3$ | $TiO_2$ | ZnO | $La_2O_3$ |
|---|---|---|---|---|---|---|---|---|---|---|---|---|
| 1 | 64.8 | 0.0 | 10.0 | 2.9 | 4.2 | 0.0 | 7.4 | 10.6 | 0.1 | 0.0 | 0.0 | 0.0 |
| 2 | 65.8 | 0.0 | 9.0 | 2.9 | 4.2 | 0.0 | 7.4 | 10.6 | 0.1 | 0.0 | 0.0 | 0.0 |
| 3 | 71.6 | 0.0 | 0.9 | 6.0 | 8.4 | 0.0 | 0.0 | 13.0 | 0.1 | 0.0 | 0.0 | 0.0 |
| 4 | 64.3 | 0.0 | 10.0 | 2.9 | 4.2 | 0.0 | 7.1 | 10.6 | 0.9 | 0.0 | 0.0 | 0.0 |
| 5 | 66.7 | 10.0 | 9.7 | 2.6 | 7.4 | 3.3 | 0.0 | 0.2 | 0.0 | 0.0 | 0.1 | 0.0 |
| 6 | 62.2 | 16.0 | 8.2 | 0.1 | 0.1 | 13.0 | 0.0 | 0.1 | 0.1 | 0.2 | 0.0 | 0.0 |
| 7 | 57.0 | 0.0 | 0.0 | 8.0 | 0.0 | 8.0 | 11.0 | 8.0 | 0.0 | 2.0 | 3.0 | 3.0 |
| 8 | 57.0 | 0.0 | 1.2 | 7.4 | 0.0 | 7.4 | 11.0 | 8.0 | 0.0 | 2.0 | 3.0 | 3.0 |

UNITS: mol %

EXAMPLE 1

An inorganic glass 1 of composition 1 was used. Polishing was first carried out to improve the smoothness of the surface of the inorganic glass 1, and then the inorganic glass 1 was kept at a temperature of 460° C. for 2 hours to remove strain caused by the polishing. An indenter 2 comprised of a diamond formed in a square-based pyramid shape having an apical angle of 136° was next pressed into the surface of the inorganic glass 1 with a load of 5 g (3 GPa) for 15 seconds in 25 places (this number of the places also applies to other examples, described below), thus forming a compressed layer 4 having a depression 3 in each of the 25 places. 200 nm polishing was then carried out using a slurry containing colloidal silica loose abrasive grains, thus removing the depressions 3. Etching was next carried out by immersing the inorganic glass 1 in an aqueous solution containing 0.025 wt % of hydrofluoric acid. An altered layer 7 thus produced was then removed by immersing the inorganic glass 1 in an alkaline etching solution of pH12, thus completing the manufacture of the test piece of Example 1.

The state of the surface of the test piece was then observed using an AFM (atomic force microscope). It was found that minute projections 5 each having a truncated cone-like shape of approximately square cross section with edges of length 4 μm at the base thereof were formed on the surface of the test piece. Moreover, the projection height was 120 nm±5 nm, showing that uniform minute projections 5 with little variation in height were formed.

EXAMPLE 2

An inorganic glass 1 of composition 1 was used. Polishing was first carried out to improve the smoothness of the surface of the inorganic glass 1. An indenter 2 comprised of a diamond formed in a square-based pyramid shape having an apical angle of 136° was next pressed into the surface of the inorganic glass 1 with a load of 10 g (1.5 GPa) for 15 seconds, thus forming compressed layers 4 each having a depression 3. Etching was next carried out by immersing the inorganic glass 1 in an aqueous solution containing 0.15 wt % of hydrofluoric acid. An altered layer 7 thus produced was then removed by immersing the inorganic glass 1 in an alkaline etching solution of pH12, thus completing the manufacture of the test piece of Example 2.

The state of the surface of the test piece was then observed using an AFM. It was found that minute projections 5 were formed on the surface of the test piece. However, unlike in Example 1, because surface treatment was not carried out after the formation of the compressed layers 4, the depressions 3 remained, and hence each minute projection 5 had a caldera shape of approximately square cross section with edges of length 8 μm at the base thereof. Moreover, because the concentration of the hydrofluoric acid was higher than in Example 1, etching of the uncompressed layer 6 proceeded more, and hence the projection height up to the caldera rim was 700 nm.

EXAMPLE 3

An inorganic glass 1 of composition 1 was used. Polishing was first carried out to improve the smoothness of the surface of the inorganic glass 1, and then the inorganic glass 1 was kept at a temperature of 460° C. for 2 hours to remove strain caused by the polishing. An indenter 2 comprised of a diamond formed in a square-based pyramid shape having an apical angle of 136° was next pressed into the surface of the inorganic glass 1 with a load of 1 g (0.6 GPa) for 15 seconds, thus forming compressed layers 4 each having a depression 3. 100 nm polishing was then carried out using a slurry containing colloidal silica, thus removing the depressions 3. Etching was next carried out by immersing the inorganic glass 1 in an aqueous solution containing 1 wt % of sulfuric acid. An altered layer 7 thus produced was then removed by immersing the inorganic glass 1 in an alkaline etching solution of pH12, thus completing the manufacture of the test piece of Example 3.

The state of the surface of the test piece was then observed using an AFM. It was found that minute projections 5 each having a truncated cone-like shape of approximately square cross section with edges of length 4 μm at the base thereof were formed on the surface of the test piece. Moreover, because an aqueous solution of sulfuric acid was used as the acidic etching solution, the etching effect was smaller than in the case of the aqueous solution of hydrofluoric acid, and hence the projection height was low at 7 nm.

EXAMPLE 4

An inorganic glass 1 of composition 2 was used. Polishing was first carried out to improve the smoothness of the surface of the inorganic glass 1. A hard metal indenter 2 having a spherical surface of curvature radius 5 μm at a tip thereof was next pressed into the surface of the inorganic glass 1 with a load of 1 g (0.6 GPa) for 15 seconds, thus forming compressed layers 4 each having a depression 3. Etching was next carried out by immersing the inorganic glass 1 in an aqueous solution containing 0.025 wt % of hydrofluoric acid. An altered layer 7 thus produced was then removed by immersing the inorganic glass 1 in an alkaline etching solution of pH12, thus completing the manufacture of the test piece of Example 4.

The state of the surface of the test piece was then observed using an AFM. It was found that minute projections 5 having a caldera shape of approximately circular cross section with a diameter of 6 μm at the base thereof were formed on the surface of the test piece. Moreover, because the $Al_2O_3$ content was lower than in Example 1 (composition 1), etching of the uncompressed layer 6 did not proceed very much, and hence the projection height up to the caldera rim was only 25 nm.

EXAMPLE 5

An inorganic glass 1 of composition 3 was used. Polishing was first carried out to improve the smoothness of the surface of the inorganic glass 1, and then the inorganic glass 1 was kept at a temperature of 460° C. for 2 hours to remove strain caused by the polishing. An indenter 2 comprised of a diamond formed in a square-based pyramid shape having an apical angle of 136° was next pressed into the surface of the inorganic glass 1 with a load of 1 g (0.6 GPa) for 15 seconds, thus forming compressed layers 4 each having a depression 3. 200 nm polishing was then carried out using a slurry containing colloidal silica, thus removing the depressions 3. Etching was next carried out by immersing the inorganic glass 1 in an alkaline etching solution comprised of an aqueous solution containing 1 wt % of potassium hydroxide and 0.2 wt % of EDTA, thus completing the manufacture of the test piece of Example 5.

The state of the surface of the test piece was then observed using an AFM. It was found that minute projections 5 each having a truncated cone-like shape of approximately square cross section with edges of length 4 μm at the base thereof were formed on the surface of the test piece. Moreover, because etching was carried out using only an alkaline etching solution, with etching using an acidic solution not being carried out, the projection height was lower than in Example 1, i.e. 12 nm.

EXAMPLE 6

An inorganic glass 1 of composition 1 was used. Polishing was first carried out to improve the smoothness of the surface of the inorganic glass 1, and then the inorganic glass 1 was kept at a temperature of 460° C. for 2 hours to remove strain caused by the polishing. A hard metal roller of dihedral angle 110° and diameter 7 mm was then swept on the inorganic glass 1 at a speed of 0.1 m/sec with a load of 25 g, thus forming linear compressed layers 4. 300 nm polishing was then carried out using a slurry containing colloidal silica, thus removing the depressions. Etching was next carried out by immersing the inorganic glass 1 in an aqueous solution containing 0.025 wt % of hydrofluoric acid. An altered layer 11 thus produced was then removed by immersing the inorganic glass 1 in an alkaline etching solution of pH12, thus completing the manufacture of the test piece of Example 6.

The state of the surface of the test piece was then observed using an AFM. It was found that linear minute projections 10 each having a flat top, a width of 10 μm and a projection height of 120 nm were formed on the surface of the test piece.

EXAMPLE 7

An inorganic glass 1 of composition 1 was used. Polishing was first carried out to improve the smoothness of the surface of the inorganic glass 1. Zirconia particles of diameter 20 μm were then sprayed onto the surface of the inorganic glass 1 using compressed air at a pressure of $9.8 \times 10^4$ Pa (1 kg/cm$^2$), thus forming a multiplicity of compressed layers 4 each having a depression 3. 200 nm polishing was then carried out using a slurry containing colloidal silica, thus removing the depressions 3. Etching was next carried out by immersing the inorganic glass 1 in an aqueous solution containing 0.025 wt % of hydrofluoric acid. An altered layer 7 thus produced was then removed by immersing the inorganic glass 1 in an alkaline etching solution of pH12, thus completing the manufacture of the test piece of Example 7.

The state of the surface of the test piece was then observed using an AFM. It was found that 50 minute projections 5 were formed on the surface of the test piece per 100 μm$^2$. Each minute projection 5 had a truncated cone-like shape of approximately circular cross section with a diameter of 4 μm at the base thereof. The projection height was 100 nm±10 nm.

EXAMPLE 8

A slurry containing 17 wt % of an alumina abrasive of particle diameter 5 μm was sprayed as a mist from a nozzle with a rectangular section of 90 mm×2.0 mm nozzle using compressed air at a pressure of 0.05 MPa onto the surface of an inorganic glass 1 of composition 1 while scanning the nozzle on the surface of the inorganic glass 1 at a speed of 25 mm/sec, thus forming a multiplicity of compressed layers 4 each having depression 3. After removal of the depressions 3, 60 nm polishing was carried out using a slurry containing a cerium powder, thus removing depressions 3. Etching was next carried out by immersing the inorganic glass 1 in an aqueous solution containing 0.10 wt % of hydrofluoric acid. An altered layer 7 thus produced was then removed by immersing the inorganic glass 1 in an alkaline etching solution of pH12, thus completing the manufacture of the test piece of Example 8.

The state of the surface of the test piece was then observed using an AFM. It was found that 84 minute projections 5 were formed on the surface of the test piece per 100 μm$^2$. Each minute projection 5 had a truncated cone-like shape of approximately circular cross section with a diameter of 570 nm at the base thereof. The projection height was 130 nm±5 nm. Because the compressed layers 4 were formed by wet blasting in this example, it was possible to form projections of very uniform height and without cracking occurring.

EXAMPLE 9

An inorganic glass 1 of composition 1 was used. A diamond-coated silicon single crystal SPM probe having a spring constant of 46N/m and a tip having a spherical surface of curvature radius 10 nm was pressed against the surface of the inorganic glass 1 and swept on the surface of the inorganic glass 1 in straight lines, thus forming compressed layers 9 each having a depression. Etching was next carried out by immersing the inorganic glass 1 in an aqueous solution containing 0.10 wt % of hydrofluoric acid. An altered layer 11 thus produced was then removed by immersing the inorganic glass 1 in an alkaline etching solution of pH12, thus completing the manufacture of the test piece of Example 9.

The state of the surface of the test piece was then observed using an AFM. It was found that ridge-shaped projections of width 1 μm and height 100±5 nm were formed accurately along the probe trajectories on the surface of the test piece.

EXAMPLE 10

The surface of an inorganic glass 1 of composition 5 was subjected to the same processing as in Example 8, thus manufacturing the test piece of Example 10.

The state of the surface of the test piece was then observed using an AFM. It was found that 49 minute projections 5 were formed on the surface of the test piece per 100 μm$^2$. Each minute projection 5 had a truncated cone-like shape of approximately circular cross section with a diameter of 460 nm at the base thereof. The projection height was 120±5 nm, showing that uniform minute projections 5 with little variation in height were formed. It was thus possible to form minute projections 5 on the surface of even an inorganic glass 1 having a composition containing $B_2O_3$ as well as $Al_2O_3$.

EXAMPLE 11

The surface of an inorganic glass 1 of composition 6 was subjected to the same processing as in Example 8, thus manufacturing the test piece of Example 11.

The state of the surface of the test piece was then observed using an AFM. It was found that 11 minute projections 5 were formed on the surface of the test piece per 100 μm$^2$. Each minute projection 5 had a truncated cone-like shape of approximately circular cross section with a diameter of 330 nm at the base thereof. The projection height was 100±5 nm, showing that uniform minute projections 5 with little variation in height were formed. As in Example 10, it was thus possible to form minute projections 5 on the surface of even an inorganic glass 1 having a composition containing $B_2O_3$ as well as $Al_2O_3$.

EXAMPLE 12

The surface of an inorganic glass 1 of composition 7 was subjected to the same processing as in Example 4 to form compressed layers 4 each having a depression 3. After removal of the depressions 3, etching was then carried out by immersing the inorganic glass 1 in an aqueous solution containing 0.10 wt % of hydrofluoric acid. An altered layer 7 thus produced was then removed by immersing the inorganic glass 1 in an alkaline etching solution of pH12, thus completing the manufacture of the test piece of Example 12.

The state of the surface of the test piece was then observed using an AFM. It was found that minute projections 5 having a caldera shape of approximately circular cross section with a diameter of 5 μm at the base thereof were formed on the surface of the test piece. The projection height at the caldera rim was 0.8 μm.

EXAMPLE 13

The surface of an inorganic glass 1 of composition 8 was subjected to the same processing as in Example 4 to form compressed layers 4 each having a depression 3. After removal of the depressions 3, etching was then carried out by immersing the inorganic glass 1 in an aqueous solution containing 0.10 wt % of hydrofluoric acid. An altered layer 7 thus produced was then removed by immersing the inorganic glass 1 in an alkaline etching solution of pH12, thus completing the manufacture of the test piece of Example 13.

The state of the surface of the test piece was then observed using an AFM. It was found that minute projections 5 having a caldera shape of approximately circular cross section with a diameter of 10 μm at the base thereof were formed on the surface of the test piece. The projection height at the caldera rim was 1.3 μm.

EXAMPLE 14

A zirconia abrasive having a mean grain size of 100 μm was injected onto the surface of an inorganic glass of composition 1 for 5 seconds to form compressed layers. Then, etching was carried out to a depth of 200 nm by immersing the inorganic glass in an aqueous solution containing 0.10 wt % of hydrofluoric acid. An altered layer thus produced was then removed by immersing the inorganic glass 1 in an alkaline etching solution of pH12, thus completing the manufacture of the test piece of Example 14.

The state of the surface of the test piece was then observed using an AFM. It was found that 0.2 minute projections were formed on the surface of the test piece per 100 μm². Each minute projection had a truncated cone-like shape of approximately circular cross section with a diameter of 20 μm at the base thereof and the height was 120 nm.

EXAMPLE 15

A steel rod with diamond fine particles coated thereon having a size of 1.5 mφ was swept on the surface of an inorganic glass of composition 1 with a load of 5 g and at a speed of 30 mm per second to form linear compressed layers. Then, etching was carried out by immersing the inorganic glass with the compressed layers formed thereon in an aqueous solution containing 0.10 wt % of hydrofluoric acid for 40 minutes. An altered layer thus produced was then removed by immersing the inorganic glass 1 in an alkaline etching solution of pH12, thus completing the manufacture of the test piece of Example 15.

The state of the surface of the test piece was then observed using an AFM. It was found that minute projections were formed on the surface of the test piece. Each minute projection had a width of 5 μm and a height of 1 μm.

EXAMPLE 16

A plurality of SUS spheres were prepared and combined into one body, to form minute projections on the surface of the inorganic glass under the same conditions as in Example 15.

The state of the surface of the test piece was then observed using an AFM. It was found that a plurality of linear minute projections were formed on the surface of the test piece. Each minute projection had a width of 5 μm and a height of 1 μm.

EXAMPLE 17

An inorganic glass 1 of composition 1 and a polyester tape coated with fine particles were prepared. Then, the tape was pressed against the surface of the inorganic glass 1 and fed in sliding urging contact with a predetermined part of the surface of the inorganic glass 1 while a slurry containing diamond abrasive grains having a grain size of 196 nm (D50), to form uncompressed layers.

Then, etching was carried out on the surface of the inorganic glass 1 to a depth of 20 nm by immersing the inorganic glass 1 in an aqueous solution containing 0.10 wt % of hydrofluoric acid. An altered layer thus produced was then removed by immersing the inorganic glass 1 in an alkaline etching solution of pH12, thus completing the manufacture of the test piece of Example 17.

The state of the surface of the test piece was then observed using an AFM. It was found that a multiplicity of linear minute projections having a height of 10 nm were formed on the surface of the test piece, at intervals of 100 nm.

COMPARATIVE EXAMPLE 1

An inorganic glass 1 of composition 4 was used. Polishing was first carried out to improve the smoothness of the surface of the inorganic glass 1. Chemical strengthening treatment was then carried out by immersing the inorganic glass 1 in a mixed molten salt of potassium nitrate and sodium nitrate in a volume ratio of 6:4 at a temperature of 380° C. for 1 hour, thus forming a compressed layer 4. The inorganic glass 1 was then irradiated with laser light of wavelength 266 nm, output power 10 mW and pulse width 5 nsec, thus completing the manufacture of the test piece of Comparative Example 1.

The state of the surface of the test piece was then observed using an AFM. It was found that the surface of the test piece had risen up to form a multiplicity of minute projections 5. Each minute projection 5 had a truncated cone-like shape of approximately circular cross section with a diameter of 5 μm at the base thereof. The projection height was 30±15 nm. The variation in the projection height was thus more than in Examples 1 and 7.

COMPARATIVE EXAMPLE 2

An inorganic glass 1 of composition 1 was used. Polishing was first carried out to improve the smoothness of the surface of the inorganic glass 1, and then the inorganic glass 1 was kept at a temperature of 460° C. for 2 hours to remove strain caused by the polishing. An indenter 2 comprised of a diamond formed in a square-based pyramid shape having an apical angle of 136° was next pressed into the surface of the inorganic glass 1 with a load of 500 g (4.2 GPa) for 15 seconds, thus forming compressed layers 4 each having a depression 3. 500 nm polishing was then carried out using a slurry containing colloidal silica, thus removing the depressions 3. Etching was next carried out by immersing the inorganic glass 1 in an aqueous solution containing 0.15 wt % of hydrofluoric acid. An altered layer 7 thus produced was then removed by immersing the inorganic glass 1 in an alkaline etching solution of pH12, thus completing the manufacture of the test piece of Comparative Example 2.

The state of the surface of the test piece was then observed using an AFM. It was found that minute projections 5 each having a caldera shape of approximately square cross section with edges of length 40 μm at the base thereof were formed on the surface of the test piece. The projection height at the caldera rim was 700 nm, there was a flat region at the top of each minute projection 5, and cracking was present at the periphery of each minute projection 5.

In Comparative Example 2, cracking thus occurred at the periphery of each minute projection 5 because a large load of 4.2 GPa was applied to the inorganic glass 1 when forming the compressed layers 4.

What is claimed is:

1. A method of processing an amorphous material, comprising the steps of:
   providing an amorphous material comprising silicon oxide and an oxide selected from the group consisting of aluminum oxide and alkaline earth metal oxide;
   applying a predetermined pressure to selected parts of a surface of said amorphous material so as to allow compressed layers to be formed uniformly over the surface, with virtually no scratching or cracking, using particles having a hardness higher than that of the amorphous material to form high-density compressed layers; and
   removing a surface layer of the amorphous material in the presence of a treatment agent that has a different removal capacity in the compressed layers and a remaining uncompressed layer, thus making the compressed layers project out, by first etching with an acidic solution and then second etching with an alkaline solution,
   wherein the compressed layers are formed by colliding the particles into the selected parts of the surface of the amorphous material by using a wet blast method of spraying the particles onto the amorphous material or by using an air blast method of spraying the particles together with compressed air onto the amorphous material, each of the particles having a substantially spherical particle shape.

2. A method of processing an amorphous material as claimed in claim 1, wherein the treatment agent is an etching solution having a different etching rate in the compressed layers and the uncompressed layer.

3. A method of processing an amorphous material as claimed in claim 1, wherein the acidic solution contains hydrofluoric acid.

4. A method of processing an amorphous material as claimed in claim 1, wherein the alkaline solution contains a chelating agent.

5. A method of processing an amorphous material as claimed in claim 1, wherein the amorphous material is an inorganic glass.

6. A method of processing an amorphous material as claimed in claim 5, wherein the inorganic glass contains aluminum oxide.

7. A method of processing an amorphous material as claimed in claim 5, wherein the inorganic glass contains alkaline earth metal oxide.

8. A method of processing an amorphous material as claimed in claim 1, wherein the particles are in the form of a slurry.

9. A method of processing an amorphous material as claimed in claim 1, wherein the particles have a mean grain size of 100 μm.

* * * * *